Dec. 15, 1942.     T. VOLOCHINE     2,305,396
METHOD AND APPARATUS FOR THE MEASUREMENT OF RADIANT ENERGY
Filed Dec. 15, 1938     2 Sheets—Sheet 1
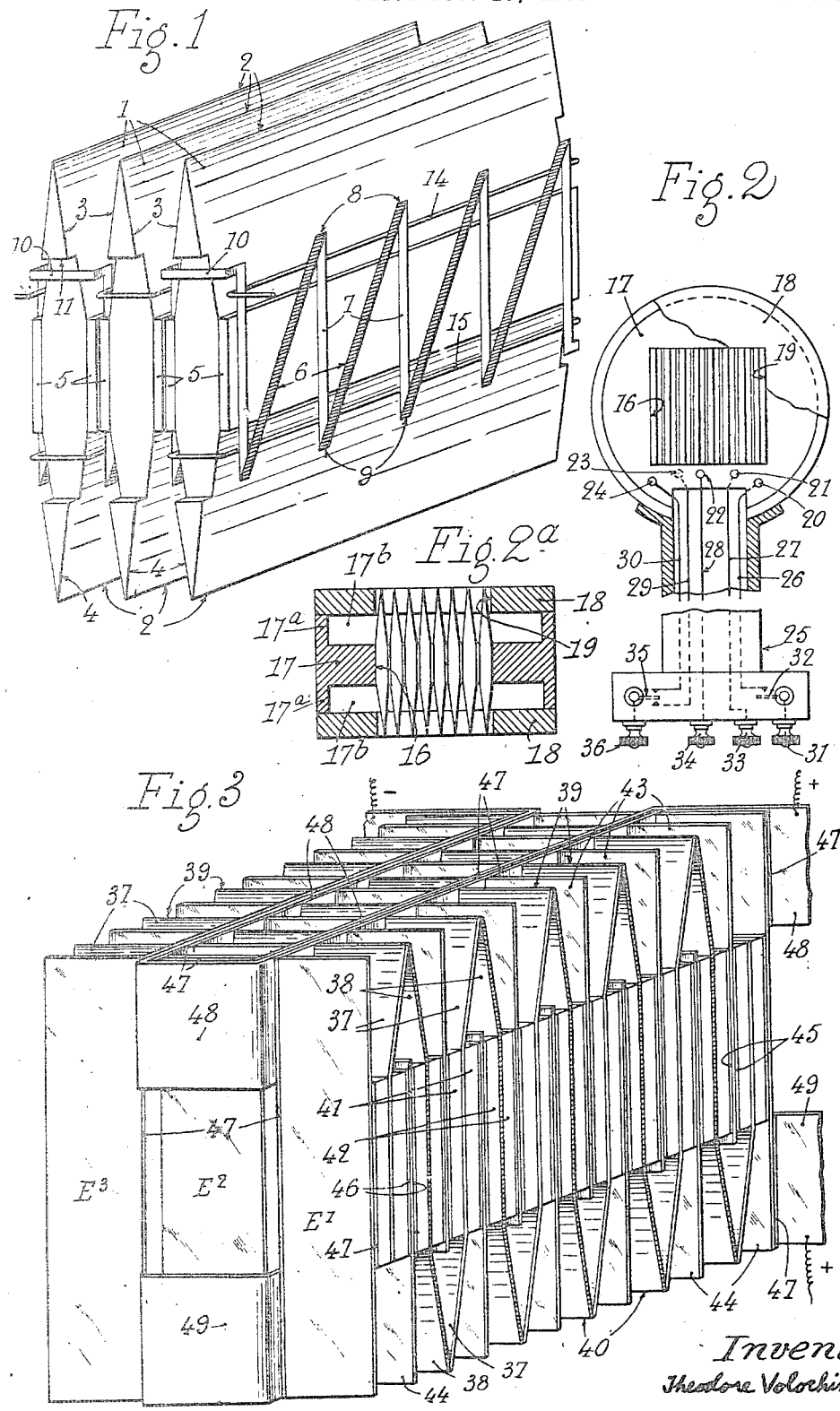
Inventor:
Theodore Volochine
By Brown & Seward
Attorneys

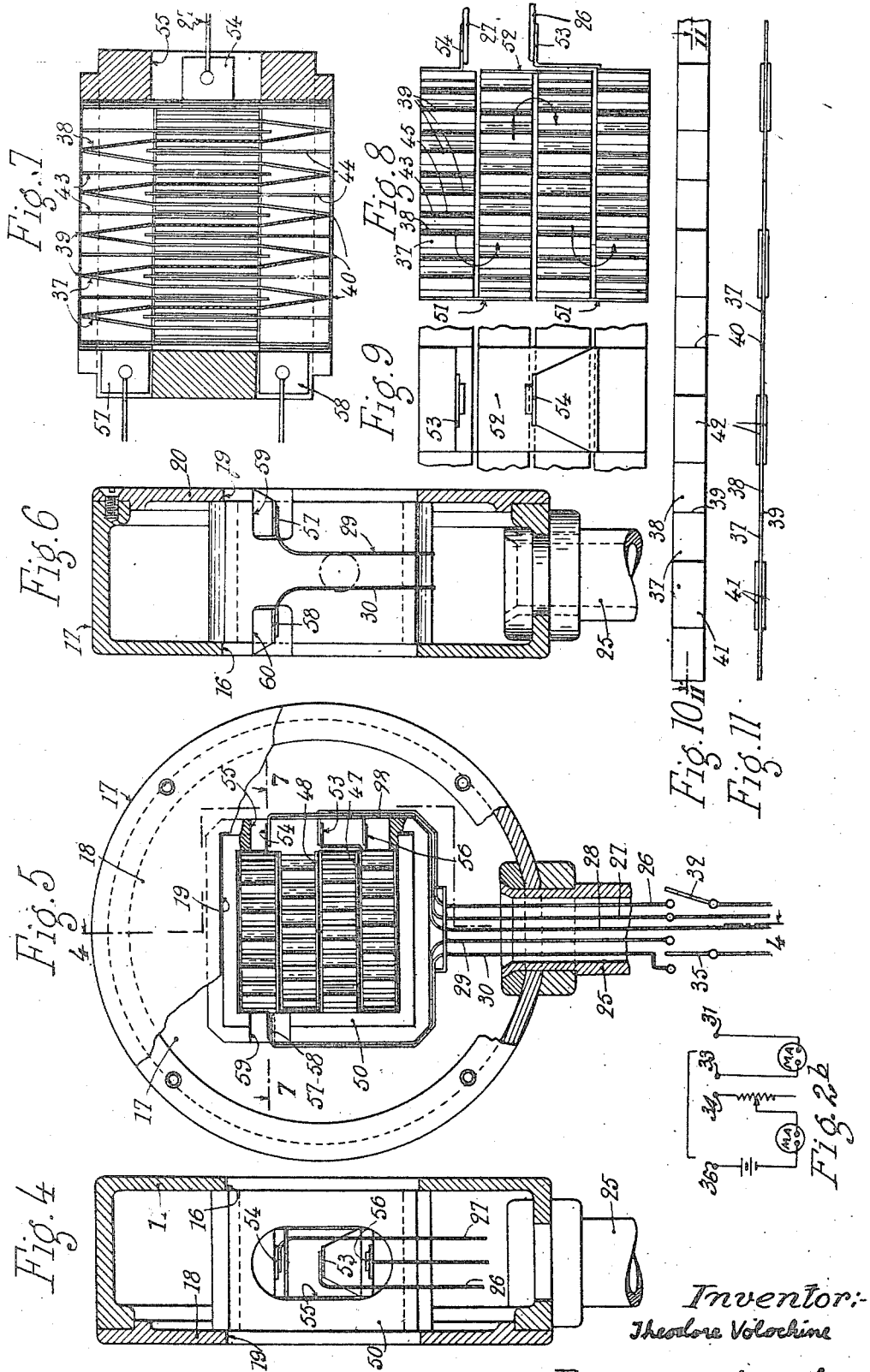

Patented Dec. 15, 1942

2,305,396

UNITED STATES PATENT OFFICE 2,305,396

METHOD AND APPARATUS FOR THE MEASUREMENT OF RADIANT ENERGY

Theodore Volochine, Paris, France; vested in the Alien Property Custodian

Application December 15, 1938, Serial No. 245,949
In Germany December 18, 1937

7 Claims. (Cl. 73—355)

Use has already been made, for the measurement of thermic energy, of thermo-electric couples having the well-known property of transforming into electric energy, the thermic energy falling upon the junction between two different metals or alloys. It is also known to connect several junctions in series or parallel and to dispose them alternately on opposite faces of an apparatus, in such manner that the said apparatus gives indications depending upon the difference of temperature between the two faces.

The apparatus of this type, hitherto known, have but a limited sensitiveness, as the number of active junctions is reduced by reason of the construction of the apparatus.

Moreover, the known apparatus are unstable, as the smallest variations of the surrounding temperature between the two faces of the apparatus due for example to mere currents of air, will cause oscillations of the pointer or other part of the galvanometer or like indicating instrument which is combined with the thermo-electric battery; otherwise stated, the stability of the zero of the apparatus is not assured.

The present invention has for its object to provide an improved method and apparatus for the absolute measurement of a thermic energy, even though weak, and for a very exact comparison between two thermic energies, which energy or energies may be radiant energies or may be produced by other energies, electric for instance, which are transformed into thermic energies.

The method according to the invention consists in utilizing a metallic radiation receiver having two radiation absorbing surfaces each constituting an absolute black body, exposing one of said surfaces to the radiation to be measured and determining the difference of temperature between the surface exposed to the radiation and the other absorbing surface of the radiation receiver.

According to the invention the absorbing surfaces forming a black body of the radiation receiver are formed with deep narrow slots or like recesses separated from each other by reflecting partitions growing thinner towards their outer ends where they terminate in very sharp edges, the ratio of the width of said slots or like recesses to their depth being such that the incident radiation is substantially entirely absorbed.

The invention has also for its object to provide an apparatus for carrying out the method according to the invention, this apparatus comprising a radiation receiver having two absorbing surfaces of the type described, and a measuring device which serves to determine the difference of temperature between the two absorbing surfaces of the receiver. The said measuring device preferably consists of thermo-electric couples which are mounted in series and/or in parallel and of which the successive junctions are alternately located so as to be subjected to the thermic energy received by one absorbing surface and by the other of the receiver.

According to one particular embodiment of the invention, the receiver consists of an assemblage of double wedge-shaped metallic blades, and the thermo-electric couples consist of thin elements which are soldered together and are mounted in zigzag between the said blades from which they are electrically insulated, so that the junctions are situated alternately in the deep and narrow recesses provided between the said blades on either face of the receiver.

According to a further embodiment, the thermo-electric couples consist of elements of metallic strips which are connected in zigzag shape by soldered joints, in such manner that said elements will constitute wedge shaped projections defining between them deep and narrow slots adapted to absorb the radiant energy.

Owing to these arrangements the number of junctions on each face of the receiving device is greatly increased per unit area (for instance for an area of one square centimetre, the number of junctions may exceed several hundred, while with the known apparatus, the number of junctions does not exceed a few dozen).

This advantage, combined with the use of absolute black bodies, gives a great sensitiveness to the apparatus as all the radiant energy is absorbed and as for a given mass of thermo-electric battery, the thermo-electric forces which are produced are proportional to the number of active junctions.

Moreover, the perfect stability of zero is obtained by the following arrangements:

On the one hand, the active elements connected by the junctions of high heat conductivity are embedded in a considerable mass, and the junctions project from both sides of the same.

And on the other hand, the apparatus consisting of the energy receiving device and of the measuring device, is arranged in a central aperture of a body having a considerable mass, consisting of copper or the like, which is a good conductor of heat, and the two sets of junctions are located on opposite faces of the same, the whole apparatus being symmetrical with reference to the middle plane parallel to the said faces.

By reason of these considerable masses, of high heat conductivity, the active elements, including the two sets of junctions, are brought to and maintained at the surrounding temperature, and the variations of this temperature will act symmetrically upon both faces of the device, so that they will have no effect upon the zero of the apparatus.

Moreover, owing to the considerable mass, the thermic energy which is received will be dissipated very rapidly, and thus there will be no accumulation of heat, and the apparatus will practically indicate the instantaneous energy received, with its variations, and the pointer will remain fixed and stable, if the energy received is constant. Furthermore, the position of equilibrium is very rapidly attained.

By giving suitable and exact dimensions to the parts of the radiation receiver, a proportionality will be obtained, which subsists within very wide limits, between the intensity of the incident radiation and the difference of temperature which is established between the hot and cold junctions.

The intensity of the incident radiated energy can be measured in absolute units by comparing the difference of temperature produced by the radiation, with the one resulting from an electric heating; preferably, the ratio between the effect of the radiation and the effect of the heating current is determined once for all by means of a source of radiation.

Further characteristics will be set forth in the following description.

In the accompanying drawings, which are given solely by way of example:

Fig. 1 is a partial diagrammatic perspective view of an embodiment of the invention comprising a pile of blades of double wedge-shaped cross-section.

Fig. 2 is a diagrammatic front view of a complete apparatus comprising a pile of the type shown in Fig. 1, part of the cover being broken away.

Fig. 2a is a horizontal section through the head of the apparatus shown in Fig. 2; and Fig. 2b is a diagram in conventional form indicating the heating circuit designed to be connected with the terminals 34 and 36 of Fig. 2 and the measuring circuit designed to be connected with the terminals 31 and 33 of the same figure.

Figure 3 is a partial perspective view of a modification in which the thermo-electric couples have the form of bands which are folded in zigzag shape and constitute themselves the black body.

Fig. 4 is a cross-section on the line 4—4 of Fig. 5, of an apparatus comprising an assembly of the type represented in Fig. 3.

Fig. 5 is a corresponding front view, with parts broken away.

Fig. 6 is a section and a side view similar to Fig. 4 but on the opposite side.

Fig. 7 is a partial cross-section on the line 7—7 of Fig. 5, on a larger scale.

Fig. 8 is a view of the assemblage of the thermoelectric couples, before mounting the electric heating resistances, on the same scale as Fig. 7.

Fig. 9 is a corresponding side view.

Fig. 10 is a front view, in development, of one of the bands which is to be folded in zigzag form.

Fig. 11 is a lengthwise section on the line 11—11 of Fig. 10.

In the embodiment shown in Fig. 1, the radiation receiver consists of a number of blades 1 consisting preferably of a metal which is proof against the action of air and moisture, such a platinum or stainless nickel steel.

The said blades 1 comprise a central part which has parallel faces and is extended by wedge shaped upper end portions terminating in a ver sharp edge 2 in order that the reflection upon this edge may be practically neglected. The sai blades form between them the slots or recesse 3 and 4 which are very narrow and deep. I should be noted that in reality the said slots o recesses are much deeper and narrower than i shown in the drawings, as the distance betwee the edges 2 of the blades 1 is only about 0.1 mm while the depth of the slots is 5 to 10 mm. an even more.

The thermo-electric couples are situated be tween the blades 1 and are suitably insulate electrically from the said blades by the insula tion 5. The thermo-electric couples consist c thin filiform elements 6 and 7 arranged in zig zag and connected together by soldered joint 8 and 9 which are situated alternately in th slots 3 and 4 on the two opposite faces of th radiation receiver.

The elements 6 and 7 consist alternately c two different metals or alloys, for instance c manganin and constantan, and should be ver fine.

The thermoelectric couples situated betwee the different blades 1 are connected in serie as represented, or in parallel, by connections 11

In order to render possible an absolute radia tion measurement, means for electric heatin are provided. Such means consist of two inde pendent heating devices 14 and 15 which are lo cated in the slots 3 and 4 of the radiation re ceiver. By an electric heating of the wire 14, 1 is possible to produce a calorific effect equal t the effect due to the radiation, and thus to meas ure the intensity of the radiation in electri units. Another possible means consists in oper ating the heating device 15 while the radiatio is striking the apparatus on its other face, s that there will be no difference of temperatur between the successive junctions.

The entire device above described is dispose in the central aperture 16 (Fig. 2) of a metalli housing 17 formed by a large mass which is good conductor of heat and consists of coppe for example. The said mass is formed for ex ample by a circular plate portion comprising a its periphery and on both of its faces a project ing rim on each of which is secured a cover also pierced with an aperture 19 registering wit the aperture 16 so as to form between the plat portion and the covers two spaces adapted t receive on the one hand the contact-pieces 2 and 21 which are connected to the respectiv ends of the set of wires 6, 7 connected in seri and on the other hand a contact-piece 22 whic is common to the two heating wires 14, 15 an two contact-pieces 23 and 24, each of which connected at the other end of one of the wir 14, 15. The piece 17 is extended, in the examp illustrated, by a stem 25 containing the cor ductors 26, 27, 28, 29, 30 which are respective connected to the contact-pieces 20, 21, 22, 2 24, these being insulated from the body 17. Tl conductor 26 is connected to a terminal through a switch 32. The conductor 27 is cor nected directly to a second terminal 33. Tl common conductor 28 leads to a terminal 3 and either of the conductors 29 and 30 may l connected, through a switch 35, to a fourth te minal 36.

Between the terminals 31 and 33 is taken the electric tension produced by the thermo-electric couples. The tension of the heating current is applied to the terminals 34 and 36 and the switch 35 serves to supply this tension to either one of the two wires 14, 15. As indicated diagrammatically in Fig. 2b, the current produced between the terminals 31 and 33 may be measured by any suitably sensitive device including a milliammeter, millivoltmeter or galvanometer, in an amplifying circuit such, for example, as that shown in U. S. Patent No. 1,820,212 issued August 25, 1931, to P. S. Bauer. The heating circuit shown in Fig. 2b includes a source of current such as a battery, means for regulating the current such as an adjustable resistance and means for measuring the current supply, which means may be similar to that just described.

The device above described will absorb about 99% of the incident radiation. If in an accurate instrument it is desired to obtain a much greater absorption, this can be effected by turning the instrument by 90° with reference to the direction of incidence of the radiation and by placing in front of the edges of the blades a reflecting metallic surface slightly inclined to the planes containing the edges of the blades. The rays which fall directly upon this slightly inclined surface are reflected by this latter into the spaces between the blades. This will appreciably increase the volume of the space which fulfills the function of an absolute black body.

Figs. 3 to 11 represent a modification in which the thermo-electric couples and the radiation receiver are closely connected. The thermo-electric couples are made up of strips 37, 38 which consist alternately of two different metals or alloys, these being connected by soldered joints 39, 40 so as to form a band (Figs. 10 and 11). To each strip, at its middle part, and on each face, is secured by soldering or otherwise, a metal plate 41 or 42 which is a good conductor of heat and electricity. The device thus obtained is folded in zigzag form, as shown in Fig. 3, so that the plates 41 will be adjacent the plates 42 of the next strip. Between the plates of the successive plies are interposed thin metallic or other strips 43, 44 having reflecting surfaces and each of which is insulated from the adjacent plates by two layers of insulation 45 and 46.

As will be noted, the strips 37, 38 form, in this construction, the wedge-shaped partitions and the plates 43, 44 divide the spaces into two half-spaces whose width is thus still further reduced with reference to the depth, and this increases the possibility of absorption of radiant energy, and provides for an entirely perfect black body.

Moreover, the plates 41, 42 form a considerable metallic mass, and on the other hand, owing to their very small electric resistance, they greatly reduce the resistance of the bands forming the thermo-electric couples.

For the construction of an apparatus, several assemblies $E^1$, $E^2$, $E^3$ (Fig. 3) of this type are juxtaposed, placing between them insulating layers 47 (Fig. 5).

The electric heating wires shown in the preceding construction are here replaced by two resistance strips 48, 49 which are situated, with electric insulation, in the spaces between the thermo-electric devices $E^1$, $E^2$, $E^3$.

This whole construction is mounted (Figs. 4, 5, 6) with the interposition of electric insulation, in a metal frame 50 which is fitted into an aperture 16 in the end wall of a case or housing 17 and into the central aperture 19 of a cover 18 which is secured by screws or otherwise to the case 50 which consists of a material which is the best possible conductor of heat, for example of copper. The said case is extended, for example, by a stem 25, as in the device shown in Fig. 2.

The different zigzag parts of the conducting band on which the junctions 39 and 40 are disposed in series and in alternate positions are themselves connected, for example, in series, as shown at 51 and 52 (Figs. 8 and 9). The two ends of the device are terminated, for instance, by two terminals 53 and 54 (Figs. 4, 5, 8, 9) which serve the same purpose as the terminals 20 and 21 of the apparatus shown in Fig. 2. To these terminals which project from the frame 50 through an aperture 55, are soldered the conductors 26, 27 leading to the terminals 31, 33 (Fig. 2) of a base. Connections (not shown) start from this point and lead to the reading and/or recording apparatus, which may obviously be of any suitable type.

The resistance strips 48 and 49 are connected with a common terminal 56, and their other ends are connected to two other terminals 57, 58. The terminal 56 (Figs. 4 and 5) extends into the opening 55 of the frame 40, and to this end the common conductor 28 is secured. The terminals 57 and 58 extend into the cut-out parts 59, 60 (Figs. 5 and 6) of the frame 50, and are secured to the conductors 29, 30 which are connected, through the switch 35 (Fig. 5), with one pole of a battery or other source of current whose other pole is connected with the conductor 28, thus providing for the electric heating of either one of the strips 48, 49, which will then heat the corresponding junctions 39 or 40, thus producing a difference of temperature between the two sets of joints resulting in an electric tension in each thermo-couple giving rise at the terminals 53, 54 to a tension which is the sum of the unit tensions.

In the two embodiments herein described, before using the apparatus, it is necessary to make an adjustment consisting in the zero adjustment of the indicating or registering device. For this purpose, the two wires 14, 15 or strips 48, 49 having the same resistance, which is exactly measured, are subjected to the same voltage. Hence these strips will heat the junctions and, if necessary, the exact positioning of these resisting wires or strips and/or their section is varied (which is an easy matter in the case of bands) until the pointer or other part of the indicating or recording device remains at zero.

When the apparatus is thus adjusted to zero, it will remain in this position irrespectively of the surrounding temperature, as the mass of the body 17 and of the housing 50 (in the second embodiment), which are good conductors of heat, provide for an immediate distribution by equal parts, in the two sets of junctions, of the action due to temperature variations.

In these conditions, it appears that if one face of the apparatus is subjected to a beam of heat rays, these latter will be absorbed by the corresponding slots or recesses forming a black body, and this will cause a lack of balance between the two series of junctions producing an electric tension between the terminals 31 and 33 (Fig. 2) which is indicated or registered by the device connected with these terminals.

It is an easy matter to determine the value of the energy of the source of radiant heat, by bringing to zero the pointer or like indicating or registering part by sending an electric current into the resistance wire or band situated on the side opposite the one which receives the radiations. The measurement of the current supplied at the time when the pointer has returned to zero will give the value of the electric energy which is the equivalent of the radiant energy received and finally the absolute value of this radiant energy. It is also possible to replace the radiant energy by electric energy so as to obtain the same deflection.

The apparatus above described are adapted for numerous applications.

They provide for the direct measurement, in absolute magnitude, of the solar radiation, whether direct or diffused by a given part of the heavens, and in general, for all other thermic radiation.

They permit, indirectly, of regulating a thermic radiation to any desired value of energy, and in consequence of regulating the temperature of the source of radiation. It is possible, for example, to regulate the temperature of a furnace to any desired value; for this purpose, it is simply necessary to electrically heat one of the resistance wires or bands to the desired temperature which can be easily regulated by adjusting the corresponding electric current, and then to expose the other face of the apparatus to the radiation of the furnace in the given conditions of distance, and to continue the heating of the furnace until the voltage between the terminals 31 and 33 (Fig. 2) falls to zero. This is shown by the return to zero of the pointer of the measuring device connected with these terminals.

Obviously, the said invention is not limited to the embodiments herein described and represented, which are given solely by way of example.

Having now described my invention what I claim as new and desire to secure by Letters Patent is:

1. In an apparatus for the measurement of radiant energy by measurement of the electric current produced by thermocouples in response to a difference of temperature between two absorbing surfaces, a radiation receiver having two absorbing surfaces facing opposite directions and each formed with wedge-shaped projections having reflecting surfaces and terminating in sharp edges, said projections leaving between them deep narrow recesses, and thermocouples the successive junctions of which are alternately disposed within recesses of the one and of the other of said absorbing surfaces.

2. In an apparatus for the measurement of radiant energy by measurement of the electric current produced by thermocouples in response to a difference of temperature between the successive junctions thereof, a radiation receiver including a central portion formed by a mass of material which is a good conductor of heat and two opposite faces of which are provided with wedge shaped projections having reflecting surfaces and terminating in sharp edges, said projections leaving between them deep narrow recesses, and thermocouples of which the successive junctions are alternately disposed within recesses of the one and of the other of said faces and the portions intermediate said junctions are embedded in said central body.

3. In an apparatus as claimed in claim 2, a housing formed by a large good heat conducting mass provided with a central aperture in which is fitted said radiation receiver, the whole assembly being symmetric relatively to a middle plane.

4. An apparatus for the measurement of radiant energy, comprising a radiation receiver having two absorbing surfaces facing opposite directions and each formed with wedge-shaped projections having reflecting surfaces and terminating in sharp edges, said projections leaving between them deep narrow recesses, thermocouples the successive junctions of which are alternately disposed within recesses of the one and of the other of said absorbing surfaces, electric resistances in said recesses, means for selectively supplying electric heating current to the resistances corresponding to either one of said absorbing surfaces, means for measuring the electric current produced by a difference of temperature between the successive junctions of said thermo-couples, means for varying the energy of said heating current and an instrument for measuring this energy.

5. In an apparatus for the measurement of radiant energy by measurement of the electric current produced in response to a difference of temperature between successive junctions of thermocouples, a band formed by a series of thermocouples, said band being folded in zigzag shape so that the junctions of the thermocouples are located at the apexes of the zigzag, and intermediate members arranged between the plies of the band and extending only over a central portion of said plies so that the end portions of the latter project outwardly and form between them deep narrow grooves bounded at their inner ends by said intermediate members, said grooves being adapted to absorb any incident radiation.

6. In an apparatus as claimed in claim 5, metallic reflecting plates partitioning each of said grooves into, at least, two narrower grooves.

7. A method for the measurement of radiant energy by the use of a radiation receiver having two radiation absorbing surfaces facing opposite directions, which consists in exposing one of the said surfaces to the radiation to be measured, electrically heating the other of said surfaces to obtain a balance of temperature between said two surfaces and measuring the electric energy necessary for maintaining this balance of temperature.

THEODORE VOLOCHINE.